(12) United States Patent
Yu et al.

(10) Patent No.: US 7,065,212 B1
(45) Date of Patent: Jun. 20, 2006

(54) DATA HIDING IN COMMUNICATION

(75) Inventors: Hong Heather Yu, Plainsboro, NJ (US); Peng Yin, Princeton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 730 days.

(21) Appl. No.: 09/698,712

(22) Filed: Oct. 27, 2000

(51) Int. Cl.
 *H04N 7/167* (2006.01)
 *G06F 11/00* (2006.01)

(52) U.S. Cl. ............................ 380/205; 714/6; 382/191
(58) Field of Classification Search ................ 714/758, 714/710, 724, 726, 732, 3, 746, 752; 382/275, 382/254, 302, 181, 190, 191; 713/176, 168; 380/200–203, 205
See application file for complete search history.

(56) References Cited

U.S. PATENT DOCUMENTS

| | | | | |
|---|---|---|---|---|
| 4,903,124 A | * | 2/1990 | Hoshi et al. ........... 375/240.22 |
| 5,365,604 A | * | 11/1994 | Kwok et al. ................. 382/275 |
| 5,944,851 A | * | 8/1999 | Lee ............................. 714/799 |
| 6,064,764 A | * | 5/2000 | Bhaskaran et al. ......... 382/183 |
| 6,085,334 A | * | 7/2000 | Giles et al. ..................... 714/7 |
| 6,134,352 A | * | 10/2000 | Radha et al. ................ 382/254 |
| 6,785,815 B1 | * | 8/2004 | Serret-Avila et al. ....... 713/176 |
| 2002/0003879 A1 | * | 1/2002 | Ibaraki et al. .............. 380/201 |

OTHER PUBLICATIONS

Resume of Min Wu, Oct. 2004, pp. 1-10.*

* cited by examiner

*Primary Examiner*—Christopher Revak
(74) *Attorney, Agent, or Firm*—Harness, Dickey & Pierce, PLC

(57) ABSTRACT

Signature information, representing important content of the data, is extracted from a first data block and then embedded in a different block. Data hiding techniques are used to minimize perception of the hidden data. Thereafter, if the first data block is lost or damaged during communication, the hidden data is extracted from the other data block and used to reconstruct the lost or damaged block. If desired, the signature information can be used along with information obtained from neighboring blocks adjacent or proximate to the lost or damaged block.

19 Claims, 8 Drawing Sheets

General architecture

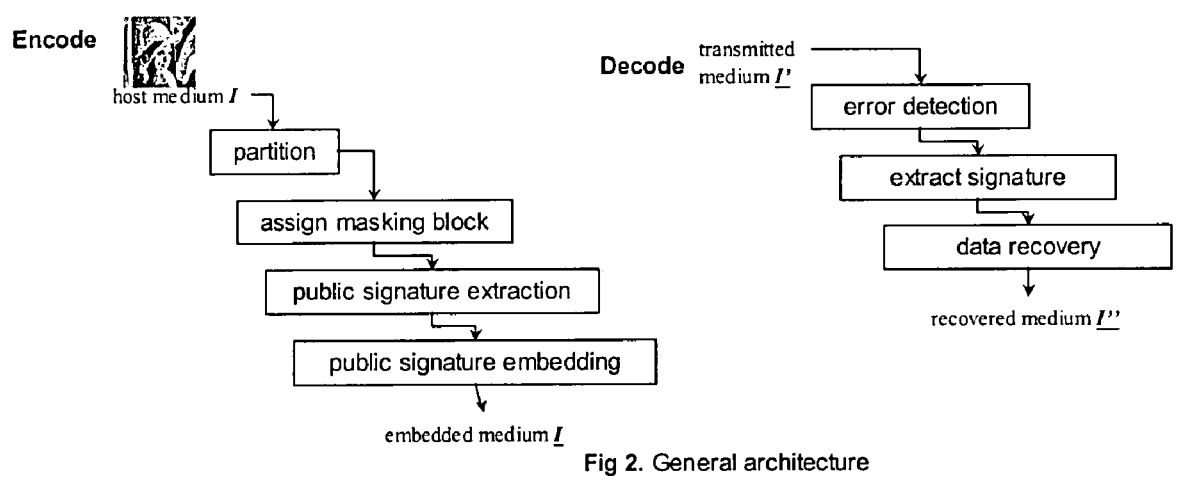
Fig 2. General architecture generate the signature of block A: 1. perform DWT; 2. quantize the lowband coefficients (DC & AC coeffs in the 2nd diag line (see Fig. 4)) ; 3. concatenate the bits $\delta[0,0]$, $\delta[0,1]$, $\delta[1,0]$, the position of the 9 largest coeffs (except $\delta[0,0] \sim \delta[1,0]$)

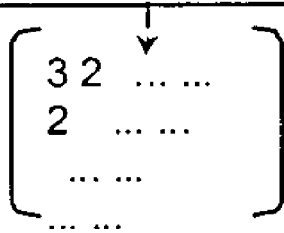

= 111010,$\underbrace{000100}$ ... ...

*position of the largest coef.* find the masking block B of block A, insert the signature into the least significant bits of Bs (in spatial domain) in an ordered manner.

For instance, top-down scan or bottom-up zig-zag scan (Figure 4)

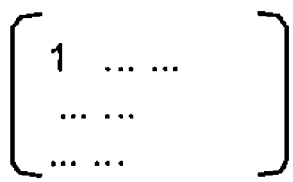
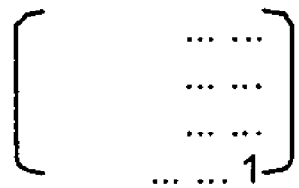

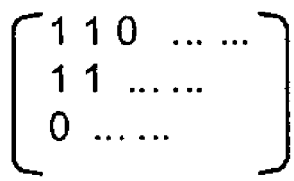
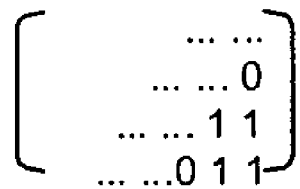

Fig 3. Embedding strategy

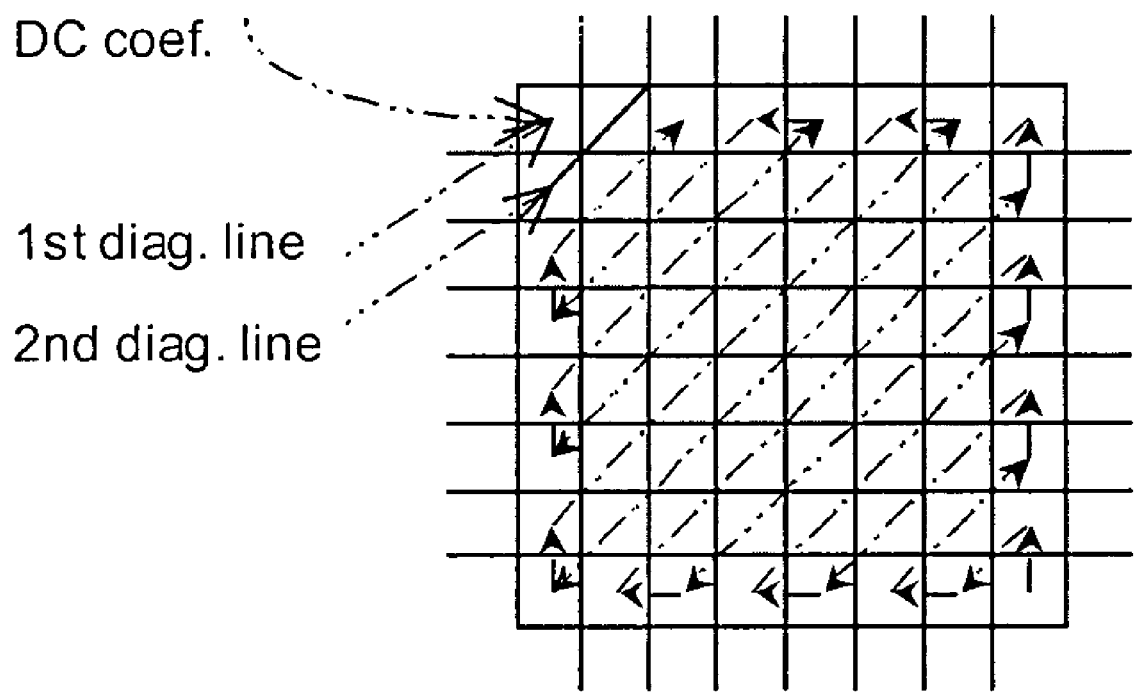
Fig 4. Bottom up zig-zag scan

DATA HIDING IN COMMUNICATION

BACKGROUND AND SUMMARY OF THE INVENTION

The present invention relates generally to data communication. More particularly, the invention relates to a technique for data recovery and error concealment using data hiding.

It is well known that media data can be vulnerable to channel errors, to different degrees, when they are transmitted through an imperfect communication channel, especially when the data is compressed. That is, during transmission, sometimes chunks of data are lost through transmission error.

Conventional methods often rely on the relationship between the corrupted data block and neighborhood blocks to conceal the error effect. This is done at the receiver end, where the values of missing data are estimated using the corrupted blocks neighborhood data values. One disadvantage of this method lies in its incapability to comprehend the actual content of the lost data block, especially when the lost data block size is relatively large or continuous, or when a perceptible quality, such as the luminance distance, between the lost data block and its neighbor blocks is large. In this scenario, perceptible artifacts can often be detected after the recovery.

If, however, some amount of knowledge of the lost block content is given, the data restoration may give better results. Knowledge of the average luminance and the motion vector of a video data block, for example, would make data restoration of a video stream more successful.

The present invention provides a system and method that uses data hiding techniques to recover or repair the missing or damaged data chunks, such as the missing strip of data shown in FIG. 1. The technique involves hiding a content representative amount of information generated or extracted from each data block into another block of the image. The hidden content serves as an abstract or signature for the block it was generated or extracted from.

When data recovery is needed, the content, such as the average luminance, of the lost block can be extracted from the hidden data stream in the non-corrupted blocks and therefore used to best conceal the error effect. Applications of the invention include recovering frame dropping and picture error in video, recovering missing data chunks or scan lines in image data, repairing lost data in faxed documents and reducing error in audio and other data intensive communications.

For a more complete understanding of the invention, its objects and advantages, refer to the following specification and to the accompanying drawings.

BRIEF DESCRIPTION OF THE DRAWINGS

FIG. 2 is a block diagram illustrating the general architecture of the data hiding system, showing both encoding and decoding processes;

FIG. 3 is a flowchart diagram illustrating an embedding strategy in greater detail;

FIG. 4 is a scanning diagram illustrating a presently preferred procedure for generating the signature of a given data block;

FIGS. 5a–5c is a flow diagram illustrating one technique for circular insertion using a largest distance strategy;

DETAILED DESCRIPTION OF THE PREFERRED EMBODIMENTS

Figure 1:
FIG. 1 is an exemplary image of a digitized photograph that has a missing strip of data.

Methodology:

The invention may be used for communication of a wide variety of different data types, including but not limited to, video data, audio data, image data, multimedia data, and the like. The present description will focus on exemplified methods for image and video data recovery, where a content representative signature is extracted, embedded, and used to recover the lost data blocks via a block-based circular embedding data hiding scheme. Other data hiding schemes are also possible. For ease of presentation, the invention will be described here using image data.

FIG. 2 shows a general architecture of a presently preferred embodiment of a data recovery system based on the invention. The host medium data 10 is first cut or partitioned 12 into blocks. In the case of JPEG image, an 8×8 block-based DCT transformation (Discrete Cosine Transform) may be used. This establishes the data hiding unit as an 8×8 image block. The encoding, i.e., data hiding, is preferably done after JPEG compression to ensure low probability of error. Each 8×8 content block is assigned 14 a designated masking block with which its signature is hidden into. Then a content-associative signature of each 8×8 block is generated using a public signature 16, such as a Q-signature (defined below) and that signature (call it $S_A$) is hidden or embedded 18 into its masking block.

At the receiver end, when part or all of a content (call it block A) is missing, the decoder detects the error 20 first and then finds A's masking block (call it block B) to extract A's content signature 22. The decoder locates the masking block based on a priori knowledge of the scheme by which masking blocks are assigned by the encoder. Then, the content signature $S_A$ along with A's neighborhood blocks are used 24 to recover block A. In the following, block A is referred as the host block of block B and block B is called masking block of block A. Notice that it is only necessary to extract the missing block signature. This design can also facilitate progressive image display in Internet application andor other applications.

1. Signature

Image compression suggests that an image can be compressed with the visual quality of it being kept by discarding the small high frequency coefficients. This means by throwing away the least significant coefficients, the visual appearance of an image does not change significantly, i.e., the overall structure of the visual content is kept in the significant coefficients. Based on this observation, a Q-signature and our embedding strategy for image data recovery are designed.

Let $I_n$, $n \in [0, N]$ represents the nth block of image I. To define the Q-signature, 1: Discrete Wavelet Transformation (DWT) is first performed on each data hiding unit, i.e., each 8×8 block. Denote $\tilde{I}_n(x, y)$ to be the intensity of (x,y)th coefficient of block $I_n$. Here, $x \in [1, 8]$, and $y \in [1, 8]$. The Q-signature of each 8×8

$$S_A(n) = \left(\delta(\tilde{I}_n(x, y))\right)$$

$$= \begin{pmatrix} \delta(\tilde{I}_n(0,0)) & \delta(\tilde{I}_n(1,0)) & \cdots \\ \delta(\tilde{I}_n(0,1)) & \ddots & \\ \vdots & & \ddots \end{pmatrix}$$

block is thus defined as: where $\delta(\tilde{I}(x,y))=m$, and $\epsilon_{m-1}<\tilde{I}(x,y)\leq\epsilon_m$, and $m=0, 1, 2, \ldots$ In a simple system, m ∈[0, 3], i.e., with 4 quantization steps. $\epsilon_{m-1}$ and $\epsilon_m$ are quantization steps. In a more elegant design, $\epsilon_{m-1}$ and $\epsilon_m$ can be defined adaptively to the neighborhood value. Notice here $\tilde{I}(x,y)$ can be single channel or multi-channel intensity function. Here, it is not necessary to use DWT and DWT only. Different transformation may be used to best suit different applications. For example, in the case of JPEG image, directly extract Q-signature from the quantized DCT coefficents can be more efficient.

2. Embedding

The loss of date is often random. To efficiently recover the randomly lost data block, it is best to spread the content-representative hidden data as much as possible to avoid collision error, i.e., to avoid the possibility of both the original data block and its corresponding signature being lost in transmission. From this viewpoint, block-based data hiding is more suitable than global data hiding for the media data recovery application. This is because the loss of data is random. Global data hiding has a high probability to have both the original data block and the signature information lost in transmission compared to block-based data hiding. If both the original data block and its signature are lost, the advantage of using data hiding to provide knowledge of original content for data recovery is gone. On the other hand, the probability of data loss varies, depending on the condition of the transmission channel. To generalize the system design, when the transmission channel is not fixed or the condition of the channel is unknown, we can assume that every block of data has a probability of data loss. For simplicity of presentation, we will assume this case in the following discussion. Notice though, when the condition of the transmission channel is known, the design should be tuned to the channel error model for best performance. Since in our generalized system we consider every block of data in the entire image has a probability of data loss, each block of data needs a content-representative signature for best data recovery performance. This indicates a data hiding ratio of 1:1, i.e., the information of each 8×8 block data is hidden into one other 8×8 block data. However, the data hiding capacity of image is typically far less than 1. In other words, the hidden data bit number should be much smaller than the original host data stream bit number. To ensure imperceptibility, therefore, the ratio of hidden data bit number over host data bit number is preferably much less than 1. That is, the signature data stream should be appreciably less than the host data stream in length. Since the large low frequency coefficients are indicative of the overall content of each block, i.e., are most important in restoring the lost data block, in the presently preferred embodiment we select only to use the low frequency coefficients and the first several largest coefficients in the mid- and high bands to construct the signature. The embedding strategy is depicted in FIG. 3.

Referring to FIG. 3, the signature of block A is first generated as described at step 26. One presently preferred technique is to use the lower order or lowband coefficients (the unshaded region 40 in FIG. 4) to develop the signature of block A. The signature can be constructed in any convenient fashion from the extracted data. A presently preferred technique is to concatenate the extracted signature data to define a sequence or string of bits.

The masking block B of block A is then identified and the signature is inserted into the least significant bits of block B as illustrated at step 28 and subsequent sub-steps 30–34. Although there are many data hiding techniques that may be used for this purpose, the illustrated technique inserts bits of the signature into the masking block using a predetermined scanning pattern. The zig-zag scanning pattern illustrated in FIG. 4 is one possible scanning pattern. As illustrated at 30 (FIG. 3), the signature bits may be inserted into the least significant bits of the masking block B. Using the predetermined scanning pattern, beginning bottom up, bits of the signature are overwritten into the least significant bits of the masking block. Thus, if the first bit of the signature of block A is 1, a 1 is written in block B. If the first bit of the signature of block A is a 0, a 0 is written in block B. This is illustrated at sub-step 32. The embedding operation proceeds in bottom up, zig-zag scan order as illustrated at sub-step 34; that is, embed 1 in the least significant bit if the next signature bit is 1, otherwise embed 0.

In the presently preferred system, only 2 bits are needed for each low band coefficient: 11→δ=3, 10→δ=2, 01→δ=1, 00→δ=0, and 6 bits are needed for the position of each large mid- or high band coefficient. Notice that in the presently preferred embodiment, we only used the position of the large mid- and high bands coefficients, for the reasons explained above. In this case, the recovery is done based on both the position of the large coefficient and corresponding large coefficients value of the neighborhood blocks. In a more elegant design, one might embed the value of the large coefficient and its position into the masking block. This will save the time on estimating the large coefficient value using neighborhood information. Though, it needs larger data hiding capacity to hide the same number of coefficients. When the signature is directly embedded in the transformed domain, slight modification on the embedding strategy maybe needed. For instance, in the case of JPEG image, a more suitable way is to embed the signature of block A, Sa, into the quantized DCT coefficients of block B. In this case, it is more efficient to embed SA into the mid-bands coefficients of block B in terms of minizing bit rate and high frequency noise.

3. Decoding

Decoding can be similarly done. Since the signature, i.e., the embedded hidden data is public, extraction can be done without the knowledge of the original host image.[6] Recovery of lost block 7: A is done with the decoded signature as the block A coefficients, in the case of JPEG image, as the block A DCT coefficients. If block A is only partially lost, the transmitted partial information can be used to attenuate the coefficients to better approximate the true value. The coefficient values can also be further tuned with conventional neighborhood estimation. Further discussion on how to well utilize the conventional neighborhood estimation, such as multi-directional error concealment, is given below. In addition, if desired, a smoothing operation may be performed around the boundary of the corrupted blocks to smooth out edgy effects.

[6] Considering our application in this study, where the original host media is not accessible at the receiver end when data recovery is conducted, public hidden data (i.e., public mark) has to be adopted.

Figure 5A:
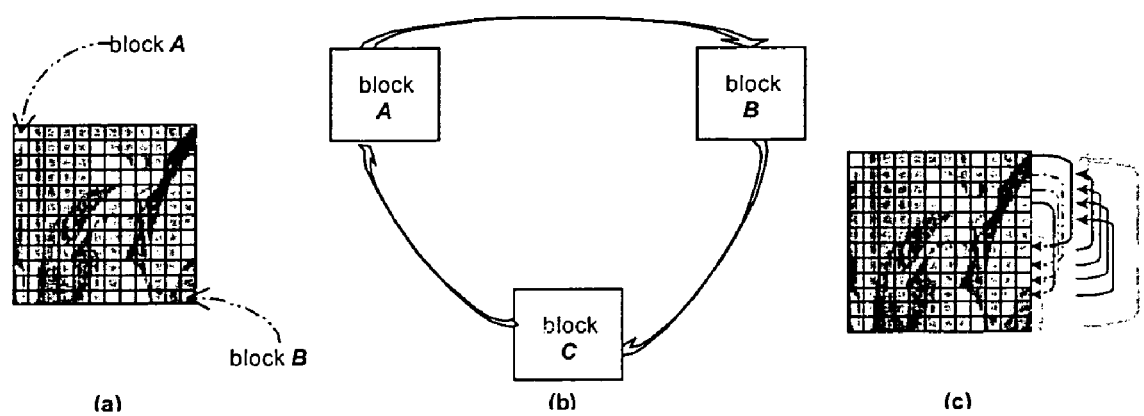
Figure 6:
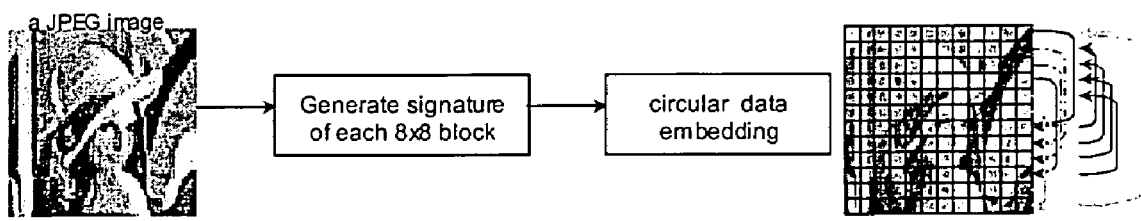
FIG. 6 is a flow diagram illustrating a second circular insertion strategy.

As discussed above, one goal of the preferred embodiment is to avoid the situation where both the host block A and the masking block B are lost. In general, the further apart A and B are, the less likely they will be lost at the same time. Therefore one preferred embodiment uses a largest distance strategy to assign masking blocks. Notice that, if B is the best position for block A, A might also be the best position for block B. FIG. 5(a) illustrates such a scenario. It is easy to see, if we embed A's signature in B and vice versa, the probability of recovery is low when both block A and B are lost. Therefore a shifted strategy may be adopted. FIG. 5(b) shows one possible solution of such a design, namely a cross iterative or circular insertion strategy. FIG. 5(c) future illustrates a circular insertion design when there is a high occurrence of missing scan lines, such as strip 50 that was shown in FIG. 1. FIG. 6 shows a circular embedding process in greater detail. The original image 52 is processed by generating a signature for each 8×8 block (step 54). The circular embedding algorithm 56 associates the signature-supplying block with a masking block according to a predetermined circular pattern, such as illustrated at 58. The circular strategy makes each block both the source of signature information and the recipient of signature information. More specifically, each block provides signature information to and receives signature information from a linked list of blocks containing at least one other block.

An alternative way to assign masking blocks for optimum probability to recover missing data is to randomly shuffle the image in block unit and then employ the embedding scheme proposed above. For a suitable random shuffling routine, see, King Ip Chan, Jianhua Lu, and Justin C.-I. Chuang, "Block Shuffling and Adaptive Interleaving for Still Image Transmission over Rayleigh Fading Channels", IEEE Transaction on Vehicular Technology, pp. 1022–1011, vol. 48, NO. 3, May. 1999.

5.1 Nonlinear embedding

Generally speaking, a smoother region (host block A) does not have any large coefficient in its mid- and high frequency bands. It thus needs fewer bits in its content representative signature, i.e., it requires less capacity in its corresponding masking block B. On the other hand, a coarser host block A', such as a texture block or edgy block, often has large coefficients in its mid- andor high band coefficients. Therefore, it requires more data hiding capacity in its corresponding masking block compared to the smoother block A. Fortunately, as we have discovered, a coarser block often provides higher data hiding capacity than a smoother block. See, M. Wu, H. Yu, A. Gelman, 'Multi-level data hiding for digital image and video', in Proceedings, SPIE99, September, 1999.

Figure 7:
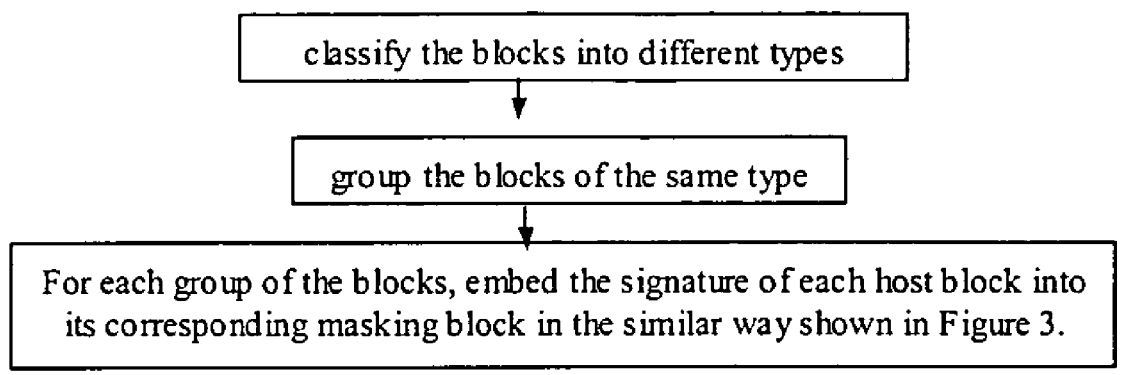
FIG. 7 is a flowchart diagram illustrating the general embedding procedure with block classification.
Figure 8:
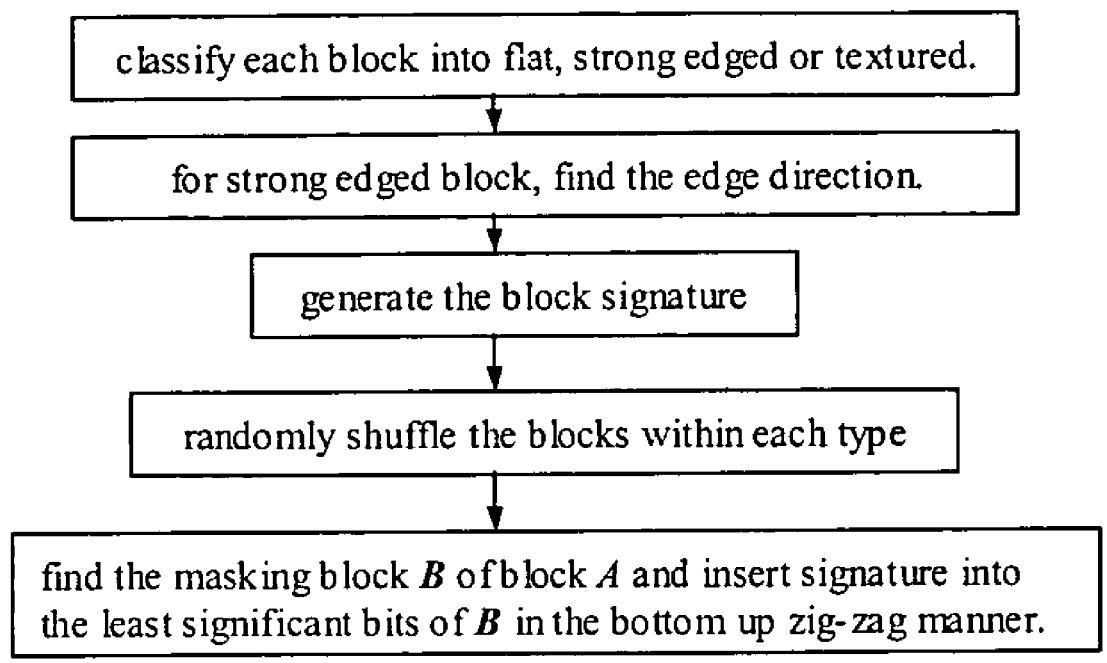
FIG. 8 is a flow diagram illustrating the technique for refining recovery results using multi-directional error concealment.

Because the embedding capacity of each block typically varies if perceptual model is taken into consideration, this indicates a nonlinear embedding strategy may be employed. Such nonlinear strategy would provide enough capacity to embed maximum information for each block and at the same time not to degrade the perceptible quality of the data. To implement an nonlinear strategy the image blocks can be classified into different types. For instance, smooth block, texture block, and edgy block. Then, the signature of the host block can be embedded into a masking block of the same type, smooth-block-to-smooth-block, texture-block-to-texture-block, and edgy-block-to-edgy-block. Within each block type, a circular iterative insertion scheme or a random shuffling scheme can be adopted. Then the same embedding scheme as that was discussed above can be used. In this case though, it is preferred to have both the large coefficient position and value embedded in the masking block. We can also adaptively quantize the large coefficients into larger quantization steps for smoother blocks and smaller quantization steps for coarser blocks. A general nonlinear embedding procedure is illustrated in FIG. 7. Generally, two to four block types will be enough. Referring to FIG. 7, blocks are classified according to block type (step 60) and blocks of the same type are grouped together (step 62). For each group of blocks, the signature of each host block is embedded into the corresponding masking block (step 64). The embedding process may be performed as shown in FIG. 3.

When decoding speed is not critical, a nonlinear embedding scheme can give a better capacity and perceptual quality tradeoff. Therefore, may give better data recovery result. However, it generally requires longer time to process than the linear ones.

5.2 Data Reconstruction

As we discussed in the above, the data recovery step of the decoding process may be enhanced by subjecting the recovered data block to further tuning using conventional neighborhood estimation schemes. Notice though, decoding speed has to be taken into consideration when other forms of (conventional) error concealment methods are utilized in addition.

To date, conventional neighborhood estimation is the most popular error concealment method. It plays an important role in combating transmission errors. Different algorithms have been studied. Among them, multidirectional interpolation method provides good performance in terms of recovery quality. See, W. Zeng and B. Liu, Geometric-structure-based Directional Filtering for Error Concealment in ImageVideo Transmission, SPIE Wireless Data Transmission at Information SystemsPhotonics East, 95, vol. 2601, pp. 145–156, October 1995.

However, the computational complexity of that technique is high, making it currently unsuitable for many real time applications. The key idea behind the multidirectional interpolation technique is to find the edge directions of error blocks and then to employ bilinear interpolation of neighborhood blocks along edges. That is, the technique utilizes the edge information of the neighborhood blocks to conceal the error block. The techniques of the present invention may be used to significantly improve the computational performance of conventional multidirectional interpolation. The improvement involves taking some amount of the host block edge information, extracting it and embedding it as part of the host block signature. This saves decoding time, since the decoder does not need to compute the edge information of error blocks from their neighborhood blocks. In addition, placing this embedded information into the masking block yields far better recovery result than can be expected using conventional neighborhood estimation techniques. According to our experience, a 30% reduction in computation may be achieved in the conventional multidirectional interpolation algorithm by employing this technique.

To further illustrate the improvement, first, each host block A is categorized as a flat, strong edged, or textured block. Then, the edge direction of each edgy block is classified into one of eight directions that equally divide a half circle. Four embedding bits are reserved for the host block edge information. We embed in the masking block B bit '0' to indicate flat or textured blocks, bit '1' (edge indication bit) to indicate strong edged block along with 3 bits to indicate edge direction of the host block. Notice that, this algorithm is especially appealing when nonlinear embedding is used. During the decoding process, the edge direction of the corrupted block is first extracted from its masking block, if the corrupted block is edgy (i.e., if the edge indication bit is '1'.) Next, the conventional multidirectional interpolation method is employed. Details of the algorithm on how to use multidirectional interpolation for error concealment can be found in the W. Zeng and B. Liu reference cited above.

In view of the foregoing, it will be appreciated that the system and method of the invention provides a very robust way to recover lost data, or to mask the effects of lost data by taking advantage of information that may not be found in the data blocks surrounding the lost data block. The data structures herein described by which signature information from one block is stored in another block may be implemented in computer memory and may also be transmitted over a communication channel by embedding in a carrier wave.

While the invention has been described in its presently preferred embodiments, and with specific reference to an image data example, it will be recognized that the invention is capable of being adapted to a wide variety of situations. Accordingly the descriptions provided here are intended to teach the principles of the invention and are not intended as limitations upon the scope of the appended claims.

What is claimed is:

1. A method for encoding digital data comprising:
   partitioning the digital data into a plurality of blocks;
   extracting signature information from a first one of said blocks;
   selecting a second one of said blocks as a masking block;
   embedding said signature information of said first block in said masking block.

2. The method of claim 1 further comprising repeating said extracting, selecting and embedding steps for each of said plurality of blocks.

3. The method of claim 1 further comprising repeating said extracting, selecting and embedding steps for each of said plurality of blocks such that each of said plurality of blocks serves as a masking block for one and only one other block.

4. The method of claim 1 wherein said selecting step is performed by scanning said plurality of blocks using a predefined scanning pattern.

5. The method of claim 4 further comprising expressing said plurality of blocks in a predetermined column and row format and wherein said scanning pattern traverses a diagonal zig-zag pattern across said column and row format.

6. The method of claim 1 wherein said extracted signature information is content-associative signature information.

7. The method of claim 1 wherein said extracted signature information is generated by expressing said data in the frequency domain having corresponding frequency coefficients and by using a selected portion of said frequency coefficients to generate said signature information.

8. The method of claim 1 wherein said embedding step is performed so as to minimize the perceptibility of said signature information within said masking block.

9. The method of claim 1 wherein said embedding step is performed using a data hiding technique in which the least significant bits of the masking block are altered based on the signature information.

10. The method of claim 1 wherein said step of selecting a masking block is performed by expressing said plurality of blocks geometrically and by maximizing the distance between said first and second blocks.

11. The method of claim 1 wherein said step of selecting a masking block is performed using a circular selection strategy whereby said first block both provides signature information to and receives signature information from a linked list of blocks containing at least one third block.

12. The method of claim 1 wherein said step of selecting a masking block is performed using a random selection strategy whereby said first block and said second block are selected by a random shuffle algorithm.

13. The method of claim 1 wherein said embedding step is performed using a nonlinear embedding strategy whereby the amount of signature information stored in a given block is controlled based on the data content of that block.

14. The method of claim 1 wherein said embedding step is performed using a nonlinear embedding strategy whereby said plurality of blocks are classified according to a predetermined set of block types and wherein the amount of signature information stored in a given block is controlled based on the given block's block type.

15. The method of claim 1 further comprising:
   identifying additional blocks in a neighborhood associated with said first block;
   extracting edge signature information from said additional blocks; and
   using said extracted edge information in generating said signature information.

16. A method of performing data reconstruction, comprising:
   accessing processor memory containing digital data that has been encoded by:
      (a) partitioning the digital data into a plurality of blocks;
      (b) extracting signature information from a first one of said blocks;
      (c) selecting a second one of said blocks as a masking block; and
      (d) embedding said signature information of said first block in said masking block;
   examining said one of said blocks to detect if an error condition exists in that block;
   upon-detection of an error condition, accessing said second block to retrieve the signature information of said first block; and
   using said retrieved signature information to make repairs to said first block.

17. The method of claim 16 further comprising identifying additional blocks in a neighborhood associated with said first block and using said additional blocks along with said retrieved signature information to make repairs to said first block.

18. The method of claim 17 wherein a multidirectional interpolation process is performed on said additional blocks to make repairs to said first block.

19. A system for performing data reconstruction, comprising:
   processor memory containing digital data that has been encoded by:
      (a) partitioning the digital data into a plurality of blocks;

(b) extracting signature information from a first one of said blocks;
(c) selecting a second one of said blocks as a masking block; and
(d) embedding said signature information of said first block in said masking block;

a processor for examining said one of said blocks to detect if an error condition exists in that block; said processor having an algorithm that causes said processor to access said second block to retrieve the signature information of said first block and to make repairs to said first block using said retrieved signature information.

* * * * *